United States Patent
Gao et al.

(10) Patent No.: US 11,962,535 B2
(45) Date of Patent: Apr. 16, 2024

(54) METHOD AND APPARATUS FOR CONFIGURING REFERENCE SIGNAL CHANNEL CHARACTERISTICS, AND COMMUNICATION DEVICE

(71) Applicant: ZTE Corporation, Guangdong (CN)

(72) Inventors: Bo Gao, Guangdong (CN); Yu Ngok Li, Guangdong (CN); Zhaohua Lu, Guangdong (CN); Yijian Chen, Guangdong (CN); Yifei Yuan, Guangdong (CN); Xinhui Wang, Guangdong (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 17/833,139

(22) Filed: Jun. 6, 2022

(65) Prior Publication Data

US 2022/0376867 A1    Nov. 24, 2022

Related U.S. Application Data

(63) Continuation of application No. 16/876,091, filed on May 17, 2020, now Pat. No. 11,356,222, which is a
(Continued)

(30) Foreign Application Priority Data

Nov. 17, 2017 (CN) .......... 201711148979.7

(51) Int. Cl.
*H04W 72/04* (2023.01)
*H04L 5/00* (2006.01)
(Continued)

(52) U.S. Cl.
CPC .......... *H04L 5/0051* (2013.01); *H04L 5/0048* (2013.01); *H04L 5/0098* (2013.01);
(Continued)

(58) Field of Classification Search
CPC ... H04L 5/0051; H04L 5/0048; H04L 5/0098; H04L 27/2613; H04L 27/26136;
(Continued)

(56) References Cited

U.S. PATENT DOCUMENTS

| 10,778,369 B2 | 9/2020 | Chen et al. |
| 2015/0139001 A1 | 5/2015 | Xue et al. |

(Continued)

FOREIGN PATENT DOCUMENTS

| CN | 101883401 A | 11/2010 |
| CN | 102404854 A | 4/2012 |

(Continued)

OTHER PUBLICATIONS

ZTE, Sanechips (Discussion on beam management, R1-1717424, Oct. 9-13, 2017). (Year: 2017).*

(Continued)

*Primary Examiner* — Maharishi V Khirodhar
(74) *Attorney, Agent, or Firm* — Perkins Coie LLP

(57) ABSTRACT

Method and apparatus for configuring channel characteristics of a reference signal, and a communication device are described. The method includes determining first type signaling, where the first type signaling carries a first type set and the first set includes a plurality of index elements; and sending the first type signaling to a second communication node.

20 Claims, 3 Drawing Sheets

Related U.S. Application Data continuation of application No. PCT/CN2018/116115, filed on Nov. 19, 2018.

(51) Int. Cl.
| | |
|---|---|
| *H04L 27/26* | (2006.01) |
| *H04W 72/23* | (2023.01) |
| *H04W 76/00* | (2018.01) |
| *H04W 76/27* | (2018.01) |
| *H04W 88/08* | (2009.01) |

(52) U.S. Cl.
CPC ......... *H04L 27/2613* (2013.01); *H04W 72/23* (2023.01); *H04W 76/27* (2018.02); *H04L 27/26136* (2021.01)

(58) Field of Classification Search
CPC ... H04L 5/0053; H04L 5/0044; H04L 5/0094; H04W 72/23; H04W 76/27; H04W 24/10; H04W 16/28; H04W 24/02; H04W 72/046
USPC .......................................................... 370/329
See application file for complete search history.

(56) References Cited

U.S. PATENT DOCUMENTS

| | | | |
|---|---|---|---|
| 2016/0112171 | A1 | 4/2016 | Sorrentino et al. |
| 2018/0227035 | A1 | 8/2018 | Cheng et al. |
| 2020/0195324 | A1 | 6/2020 | Grant et al. |
| 2020/0389883 | A1 | 12/2020 | Faxer et al. |

FOREIGN PATENT DOCUMENTS

| | | | |
|---|---|---|---|
| CN | 103945447 | A | 7/2014 |
| CN | 106559164 | A | 4/2017 |
| CN | 108092754 | A | 5/2018 |
| WO | 2016134585 | A1 | 9/2016 |
| WO | 2016161408 | A1 | 10/2016 |
| WO | 2017128800 | A1 | 8/2017 |

OTHER PUBLICATIONS

Samsung (R1-1717605, "on beam management, Measurement and reporting", Oct. 9-13, 2017), (Year: 2017).*
Ericsson (On beam indication , measurement, and reporting, R1-1716350, Oct. 9-13, 2017). (Year: 2017).*
Qualcomm (R1-1718920, Beam management offline discussion summary), see item 6 on the second page. (Year: 2017).*
International Search Report and Written Opinion dated Oct. 10, 2018 for International Application No. PCT/CN2018/096115, filed on Jul. 18, 2018 (8 pages).
International Search Report and Written Opinion dated Feb. 3, 2019 for International Application No. PCT/CN2018/116115, filed on Nov. 19, 2018 (10 pages).
Korean Office Action received in corresponding Korean Patent Application No. 10-2020-7017037, dated Nov. 30, 2021, with English summary, 7 pages.
Samsung, "On Beam Management, Measurement and Reporting," 3GPP TSG RAN WG1 Meeting 90bis, Prague, Czech Republic, Oct. 9-13, 2017, R1-1717605, 16 pages.
ZTE et al., "Discussion on beam management," 3GPP TSG RAN WG1 Meeting #90-bis, Prague, Czech Republic, Oct. 9-13, 2017, R1-1717424, 12 pages.
Supplementary European Search Report issued in EP Patent Application No. 18877546, dated Nov. 25, 2020, 1 page.
Japanese office action issued in JP Patent Application No. 2022-116108, dated Jul. 4, 2023, 7 pages. English translation included.
European Search Report for EP Patent Application No. 22195686.5, dated Jan. 30, 2023, 10 pages.
CATT, "Consideration on beam management," 3GPP TSG RAN WG1 Meeting 90bis, R1-1717812, Prague, CZ, Oct. 9-13, 2017, 10 pages.
Ericsson, "On beam indication, measurement, and reporting," 3GPP TSG-RAN WG1 NR Ad Hoc #3, R1-1716350, Nagoya, Japan, Sep. 18-21, 2017, 13 pages.
ZTE, "Enhancements on Multi-beam Operation," 3GPP TSG RAN WG1 Meeting #102-e, R1-2005454, e-Meeting, Aug. 17-28, 2020, 11 pages.
3GPP TS 38.214 V17.1.0 (Mar. 2022), Technical Specification, 3rd Generation Partnership Project; Technical Specification Group Radio Access Network; NR; Physical layer procedures for data (Release 17), 225 pages.
3GPP TS 38.214 V17.2.0 (Jun. 2022), Technical Specification, 3rd Generation Partnership Project; Technical Specification Group Radio Access Network; NR; Physical layer procedures for data (Release 17), 228 pages.
3GPP TS 38.331 V17.0.0 (Mar. 2022), Technical Specification, 3rd Generation Partnership Project; Technical Specification Group Radio Access Network; NR; Radio Resource Control (RRC) protocol specification (Release 17), 1221 pages.
3GPP TS 38.331 V17.1.0 (Jun. 2022), Technical Specification, 3rd Generation Partnership Project; Technical Specification Group Radio Access Network; NR; Radio Resource Control (RRC) protocol specification (Release 17), 1273 pages.
3GPP TS 38.321 V17.0.0 (Mar. 2022), Technical Specification, 3rd Generation Partnership Project; Technical Specification Group Radio Access Network; NR; Medium Access Control (MAC) protocol specification (Release 17), 221 pages.
3GPP TS 38.321 V17.1.0 (Jun. 2022), Technical Specification, 3rd Generation Partnership Project; Technical Specification Group Radio Access Network; NR; Medium Access Control (MAC) protocol specification (Release 17), 241 pages.
3GPP TS 38.212 V17.0.0 (Dec. 2021), Technical Specification, 3rd Generation Partnership Project; Technical Specification Group Radio Access Network; NR; Multiplexing and channel coding (Release 17), 190 pages.
Nokia et al., "Summary of QCL," 3GPP TSG-RAN WG1 Meeting #90bis, R1-1718863, Prague, Czech Republic, Oct. 9-13, 2017, 21 pages.
Samsung, "On Beam Indication," 3GPP TSG RAN WG1 Meeting #90bis, R1-1717627, Prague, Czech Republic, Oct. 9-13, 2017, 9 pages.
Samsung, "Remaining details on QCL," 3GPP TSG RAN WG1 Meeting #90b, R1-1717634, Prague, Czech Republic, Oct. 9-13, 2017, 9 pages.
Samsung, "Remaining details on CSI-RS," 3GPP TSG RAN WG1 Meeting #91, R1-1720310, Reno, USA, Nov. 27-Dec. 1, 2017, 9 pages.
Samsung, "Remaining details on QCL," 3GPP TSG RAN WG1 Meeting #91, R1-1720315, Reno, USA, Nov. 27-Dec. 1, 2017, 11 pages.
Chinese office action issued in CN Patent Application No. 202111171852.3, dated Jun. 5, 2023, 13 pages. English translation included.
U.S. Appl. No. 62/587,441, filed Nov. 16, 2017, entitled "Configuring Spatial QCL Reference in a TCI State," 57 pages.
U.S. Appl. No. 62/560,949, filed Sep. 20, 2017, entitled "Method and apparatus of beam determination in a wireless communication system," 58 pages.
U.S. Appl. No. 62/585,871, filed Nov. 14, 2017, entitled "Method and Apparatus for Uplink Beam Management in Next Generation Wireless Systems," 55 pages.
U.S. Appl. No. 62/456,745, filed Feb. 9, 2017, 14 pages.
U.S. Appl. No. 62/474,418, filed Mar. 21, 2017, entitled "Method and Apparatus for reference signals in wireless systems," 24 pages.
U.S. Appl. No. 62/571,326, filed Oct. 12, 2017, entitled "Method and Apparatus for Beam Indication in Next Generation Wireless Systems," 37 pages.
U.S. Appl. No. 62/583,868, filed Nov. 9, 2017, entitled "Method and Apparatus for Reference Signals in Wireless Systems," 59 pages.
Korean office action issued in KR Patent Application No. 10-2022-7031251, dated Apr. 24, 2023, 11 pages. English translation included.

(56) References Cited

OTHER PUBLICATIONS

Chinese office action issued in CN Patent Application No. 202111171852.3, dated Dec. 29, 2022, 10 pages. English translation included.
Chinese office action issued in CN Patent Application No. 202111171852.3, dated Jun. 6, 2022, 15 pages. English translation included.
Indonesian office action issued in ID Patent Application No. P00202004414, dated Aug. 14, 2023, 6 pages. English translation included.
Korean office action issued in KR Patent Application No. 10-2022-7031251, dated Nov. 27, 2023, 4 pages. English translation included.
Japanese Decision of Patent issued in JP Patent Application No. 2022-116108, dated Jan. 9, 2024, 4 pages. English translation included.

\* cited by examiner

METHOD AND APPARATUS FOR CONFIGURING REFERENCE SIGNAL CHANNEL CHARACTERISTICS, AND COMMUNICATION DEVICE

CROSS-REFERENCE TO RELATED APPLICATIONS

This patent document is a continuation of U.S. patent application Ser. No. 16/876,091, filed on May 17, 2020, which is a continuation of and claims the benefit of priority to International Patent Application No. PCT/CN2018/116115, filed on Nov. 19, 2018, which claims the benefit of priority to Chinese Patent Application No. 201711148979.7, filed on Nov. 17, 2017. The entire contents of the before-mentioned patent applications are incorporated by reference as part of the disclosure of this application.

TECHNICAL FIELD

The present application relates to the field of communications, for example, to a method and apparatus for configuring channel characteristics of a reference signal, and a communication device.

BACKGROUND

A high band having an ultra-wide bandwidth, that is, millimeter-wave communication, has become an important direction in the development of mobile communication in the future and has attracted the attention of academia and industry worldwide. In particular, with the increasing congestion caused by massive connected spectrum resources and physical networks, the advantages of millimeter waves have become increasingly attractive. Many standards organizations such as the Institute of Electrical and Electronics Engineers (IEEE) and the 3rd Generation Partner Project (3GPP) have begun their standardization work. For example, in the 3GPP standards group, high-band communication will become an important innovation point of a new Radio Access Technology (New RAT) of 5G by virtue of the significant advantage of a large bandwidth.

However, high-band communication also faces the challenge of link attenuation including, for example, large propagation path loss, greater absorption of air (such as oxygen) and heavy rain fade. Faced with these challenges, high-band communication systems may take advantage of the short wavelengths of high bands and easy antenna integration and use multi-antenna arrays and beamforming schemes to obtain high antenna gains and counteract signal transmission loss to ensure link margin and improve communication robustness.

During antenna weight (also known as precoding and beam) training, at a high band, a transmitting end sends a training pilot and a receiving end receives a channel and performs channel estimation. Then, the high-band receiving end needs to feed back the channel state information to the training transmitting end so that it is easy for the transceiver to find, from available transceiver antenna weight pairs, multiple antenna weight pairs that can be used for multi-channel data transmission, thereby improving the overall spectral efficiency.

SUMMARY

The present application provides a method and apparatus for configuring channel characteristics of a reference signal, and a communication device to improve the problem of greatly increasing beam indication overheads.

The present application provides a method for configuring channel characteristics of a reference signal. The method is applied to a first communication node and includes: determining a first type signaling, where the first type signaling carries a first type set and the first type set includes a plurality of index elements; and sending the first type signaling to a second communication node.

The present application further provides a method for configuring channel characteristics of a reference signal. The method is applied to a second communication node and includes: receiving a first type signaling sent by a first communication node; and obtaining a first type set carried in the first type signaling, where the first type set includes a plurality of index elements.

The present application further provides an apparatus for configuring channel characteristics of a reference signal. The apparatus is configured in a communication device and includes a signaling determination unit and a signaling sending unit.

The signaling determination unit is configured to determine first type signaling, where the first type signaling carries a first type set and the first type set includes a plurality of index elements.

The signaling sending unit is configured to send the first type signaling to a second communication node.

The present application further provides a terminal. The terminal includes a memory, a processor, and a computer program stored in the memory and executable on the processor, where the processor executes any one of the preceding methods.

BRIEF DESCRIPTION OF DRAWINGS

Drawings in embodiments of the present application are described below to provide a further understanding of the present application. The drawings are used to explain the present application in conjunction with the description and are not intended to limit the scope of the present application.

DETAILED DESCRIPTION

Figure 1:
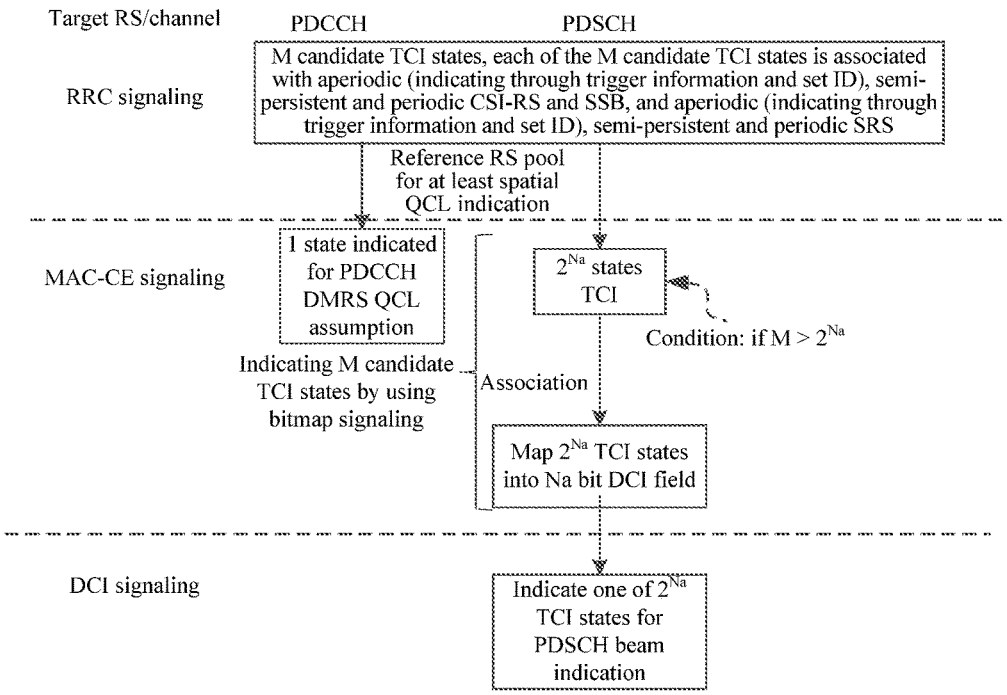
FIG. 1 is a schematic diagram of a beam indication for PDSCH and PDCCH according to an embodiment of the present application.

To facilitate a better understanding by those skilled in the art, the present application will be further described below in conjunction with drawings. The embodiments described below are not intended to limit the scope of the present application. If not in collision, the embodiments described herein and the various methods in the embodiments may be combined with each other.

Before the method and apparatus provided in embodiments of the present application are described, related concepts are described below. In embodiments of the present application, the reference signal includes at least one of the signals listed below.

(1) Cell-specific reference signal (CRS)
(2) Channel state indication reference signal (CSI-RS)
(3) Channel state indication reference signal (CSI-RS) for beam management
(4) Channel state information interference measurement (CSI-IM) signal
(5) Demodulation reference signal (DMRS)
(6) Downlink demodulation reference signal
(7) Uplink demodulation reference signal
(8) Sounding reference signal (SRS)
(9) Phase-tracking reference signal (PT-RS)
(10) Mobility reference signal (MRS)
(11) Beam-specific reference signal (BRS)
(12) Beam refinement reference signal (BRRS)
(13) Random access channel (RACH) signal
(14) Synchronization signal (SS)
(15) Synchronization signal block (SS block)
(16) Primary synchronization signal (PSS)
(17) Secondary synchronization signal (SSS)

The channel characteristics include physical transmission channel characteristics such as horizontal transmission azimuth, vertical transmission azimuth, horizontal receiving azimuth, and vertical receiving azimuth; and radio frequency and baseband circuit characteristics such as antenna element pattern, antenna placement, baseband time offset, frequency offset, and phase noise.

The beam may be a resource (for example, precoding at the transmitting end, precoding at the receiving end, antenna port, antenna weight vector, or antenna weight matrix). A beam symbol may be replaced by a resource index because the beam may be bound to some time-frequency-code resources in terms of transmission. The beam may also be a transmission (sending/receiving) mode. The transmission mode may include space division multiplexing or frequency domain/time domain diversity.

The receiving beam indication means that the transmitting end may perform indication through the current reference signal, a reference signal (base reference signal) fed back by an antenna port and a user equipment (UE), and the quasi-co-location assumption of the antenna port.

The receiving beam refers to a beam at a receiving end for which indication is not required or refers to a beam at a receiving end indicated by the transmitting end through the current reference signal, the reference signal (base reference signal) fed back by the antenna port and the user equipment (UE), and the quasi-co-location assumption of the antenna port.

In an embodiment, in the beam indication, the original reference signal refers to a reference signal that has been previously measured and used as a reference source; the target reference signal refers to a reference signal that needs to be indicated by the channel characteristics and is used for determining uploading of the channel characteristics of the associated reference signal.

Parameters related to the QCL include Doppler spread, Doppler shift, delay spread, average delay, an average gain, spatial parameters, spatial relationships and spatial receiving parameters.

The link reconfiguration request is also called a beam recovery request.

The present application provides a method for configuring channel characteristics of a reference signal. The method includes step 100 and step 200.

In step 100, a base station configures a first type set including M sets, where the ith set includes Ni index elements.

In step 200, the base station sends signaling to a UE, where the signaling carries the first type set including M sets.

The ith set of the M sets includes Ni index elements. The configuration information is notified to the UE. M and Ni are integers greater than or equal to 1. In view of a single beam, each set in the first type set may include only one index element. The first type set may be called a transmission control indication, a candidate transmission configuration indication or an uplink transmission control indication.

For example, when each set in the first type set includes one index element, the first type set, that is, the candidate transmission configuration indication state, is as described in Table 1.

TABLE 1

Example one of candidate transmission configuration indication state

| State Number | Reference Signal Index |
|---|---|
| 0 | CRI-1 |
| 1 | CRI-8 |
| ... | ... |
| N − 1 | SS block-8 |

In general cases, the candidate transmission configuration indication state is as listed in Table 2. Each state may be associated with one or more reference signal indexes.

TABLE 2

Example two of candidate transmission configuration indication state

| State Number | Reference Signal Index |
|---|---|
| 0 | CRI-7 |
|   | CRI-8 |
| 1 | CRI-8 |
|   | SS block-11 |
| ... | ... |
| N − 1 | CRI-6 |
|   | SS block-12 |

Each index element includes at least one of an index element number, a reference signal type index, a reference signal resource configuration index, a reference signal resource set index, a reference signal resource index, a reference signal port index, a resource block index, a resource block burst index, a resource block burst set index, a measurement limit window index, a time domain window index, a report configuration index, a beam grouping index, a measurement constraint, a configuration constraint, a time constraint, trigger information or a reference signal group index.

A reference signal includes at least one of a synchronization signal block (SS block), a channel state indication reference signal (CSI-RS), a sounding reference signal (SRS), a physical random access channel (PRACH) signal or a demodulation reference signal (DMRS).

For an aperiodic reference signal, such as an aperiodic CSI-RS, it is indicated that the aperiodic CSI-RS needs to be configured with additional trigger information. The system may trigger the aperiodic CSI-RS for multiple times. The trigger information is used for distinguish between specific aperiodic-CSI-RS indications. In an embodiment, an indexing behavior is trigger indexing, and the aperiodic-CSI-RS indication mode is trigger indexing+CRI.

In an embodiment, reconfiguring the first type set includes at least one of the following operations: adding a new first type set to the first type set; deleting a indicated set from the first type set; updating a indicated element in the indicated set in the first type set; deleting the indicated element in the indicated set in the first type set; or adding a new index element to the indicated set in the first type set. In an embodiment, reconfiguration of the first type set may be implemented through radio resource control (RRC) signaling or medium access control-control element (MAC-CE) signaling. In an embodiment, the reconfiguration may be implemented through one piece of independent signaling, not just through the first type signaling.

Based on the first type set, sets can be screened out from the first type set to form a second type set. In an embodiment, the action of generating the second type set includes at least one of the following operations: (1) activating sets in the first type set and forming the second type set by the activated sets in the first type set; (2) combining sets in the first type set into the second type set; or (3) combining index elements in sets in the first type set to form the second type set.

The second type signaling is sent to the second communication node. The second type set includes S sets. The ith set of the S sets includes Ki index elements. S and Ki are integers greater than or equal to 1. In an embodiment, the method for configuring channel characteristics of a reference signal includes using a bitmap to instruct the sets in the first type set or index elements in the sets in the first type set to form the second type set. Each set in the first type set or each index element in the sets in the first type set corresponds to a respective bit in the bitmap. The bitmap indicates, by using elements 0 and 1 and positions of the elements in a binary series, whether the associated information is valid or activated.

A specific value in a bit position represents (I) activation, combination or selection of an associated set or represents (II) activation, combination or selection of an index element in the associated set. Sets or index elements in the sets selected through the bitmap are encoded by order of the bitmap to indicate sets in the second type set or index elements in the sets in the second type set.

For example, when the first type set includes 16 sets, signaling for activation of eight sets in the first type set is indicated explicitly (for example, 1, 3, 5, 6, 7, 8, 15, 16) or indicate by using the bitmap.

In an embodiment, each bit of 16 bits corresponds to a respective set in the first type set. 1 indicates an activated set and 0 indicates a non-activated set. For example, 16'b1010111100000011. Therefore, only 16 bits are needed to effectively indicate and activate any of these sets. In an embodiment, when the number of sets that need to be activated is greater than or equal to the threshold k, the sets are indicated using the bitmap; when the number of sets that need to be activated is less than the threshold k, the sets are indicated explicitly. k is a positive integer greater than or equal to 1. In an embodiment, k=⌈T/⌊log(T)⌋⌉. T denotes the number of sets in the first type set.

In an embodiment, the explicit and bitmap method can be extended for use in indication of elements in sets and joint activation of sets and elements in sets.

In another embodiment of the present application, in the second type set, X1 sets in the second type set are indicated explicitly and X1 sets are indicated using the bitmap. X1 is an integer greater than or equal to 1. In an embodiment, the second type set is indicated using two different indication methods. The bitmap can effectively save costs, but cannot provide effective sequence information. In selection from the first type set, sets in indicated positions in the second type set are inconsistent with other sets in terms of default configuration.

In an embodiment, according to a rule (including at least one of a set with lowest index; a set with highest index; or a set with a specific index configured or predesignated by the first communication node), an agreed set in the second type set is used for indicating an associated physical uplink control channel (PUCCH) or indicating a channel characteristic assumption of a demodulation reference signal of the associated PUCCH.

For example, when the first type set includes 16 sets, signaling for activation of eight sets in the first type set may be indicated by one piece of explicit signaling plus one bitmap. For example, when 1, 3, 5, 6, 7, 8, 15 and 16 are activated and 6 serves as the first set in the second type set, the signaling format is that {explicit indication, bitmap}={6, 16'b1010101100000011}. In an embodiment, when the bitmap does not indicate sets that are indicated explicitly, the signaling format is that {explicit indication, bitmap (skipping explicitly indicated bits)}={6, 15'b101011100000011}. In an embodiment, the obtained second type set is as below.

| Serial Number of Second type set | Index of Corresponding First type set |
| --- | --- |
| 1 | First type set - set 6 |
| 2 | First type set - set 1 |
| 3 | First type set - set 3 |
| 4 | First type set - set 5 |
| 5 | First type set - set 8 |
| 6 | First type set - set 8 |
| 7 | First type set - set 15 |
| 8 | First type set - set 16 |

The following embodiment is described in conjunction with scenarios of DL control and data channel as well as UL control and data channel.

An optional set formed from the first type set or the second type set is indicated by a third type signaling. In an embodiment, the third type signaling may be MAC-CE signaling or Downlink Control Information (DCI) signaling. In an embodiment, the third type signaling indicates at least one of a set in the first type set or a set in the second type set so as to indicate at least one of the following items: (a) a channel characteristic assumption of an associated downlink demodulation reference signal; (b) an associated uplink demodulation reference signal or a channel characteristic assumption of the associated uplink demodulation reference signal; (c) an associated physical uplink control channel (PUCCH) or an associated layer of the associated PUCCH; (d) an associated physical uplink shared channel (PUSCH) or an associated layer of the associated PUSCH; item (e) a channel characteristic assumption of an associated channel state indication reference signal (CSI-RS); (f) a channel characteristic assumption of an associated sounding reference signal (SRS); or (g) a channel characteristic assumption of an associated interference measurement resource (IMR) reference signal.

The third type signaling is sent to the second communication node.

FIG. 1 is a schematic diagram of a beam indication method according to an embodiment of the present application. The method is applicable to scenarios of beam indication for physical downlink shared channel (PDSCH) and physical downlink control channel (PDCCH). FIG. 1 involves the following items:

Target RS/channel;
RRC signaling;
MAC-CE signaling;
DCI signaling;
M candidate TCI states, each of which is associated with aperiodic (identified by triggered info or set ID), semi-persistent and periodic CSI-RS and SSB, and aperiodic (identified by triggered info or set ID), semi-persistent and periodic SRS;
Reference RS pool for at least spatial QCL indication;
1 state indicated for PDCCH DMRS QCL assumption;
Using bitmap signaling for M candidate TCI states;
$2^{Na}$ states TCI;
Mapping $2^{Na}$ TCI states into Na bit DCI field;
Indicating one of $2^{Na}$ TCI states for PDSCH beam indication.

First, a base station configures M first-type sets, that is, configures a set of M candidate transmission configuration indication tag control information (TCI) states. Each set is associated with aperiodic, semi-persistent and periodic CSI-RS and SSB. That is, each set manages at least one of aperiodic, semi-persistent, and periodic CSI-RS or SSB. The M first-type sets are carried in a first type signaling. The first type signaling is sent to a UE through RRC. The set of candidate TCI states may also be associated with SRS resources that are not semi-persistent or periodic.

For PDCCH, indication may be performed through MAC-CE. For PDSCH, when $M > 2^{Na}$, MAC-CE signaling is enabled and $2^{Na}$ TCI states are selected from the M candidate TCI states. $2^{Na}$ and Na bits are associated with a DCI indication field, that is, second type signaling.

Finally, for PDSCH, beam indication is performed through DCI so that transmission of the third type signaling is completed.

A method for jointly encoding PDCCH and PDSCH is present. Since MAC-CE signaling is involved and sharable, the activated first candidate TCI state may be used as the indication beam of PDCCH.

In an embodiment, the beam indication for PDSCH and PDCCH is implemented by QCL indication of the associated DMRS signal. That is, the reference RS index information is carried in TCI and is associated with the DMRS signal of the corresponding PDSCH in the final indication phase.

Figure 2:
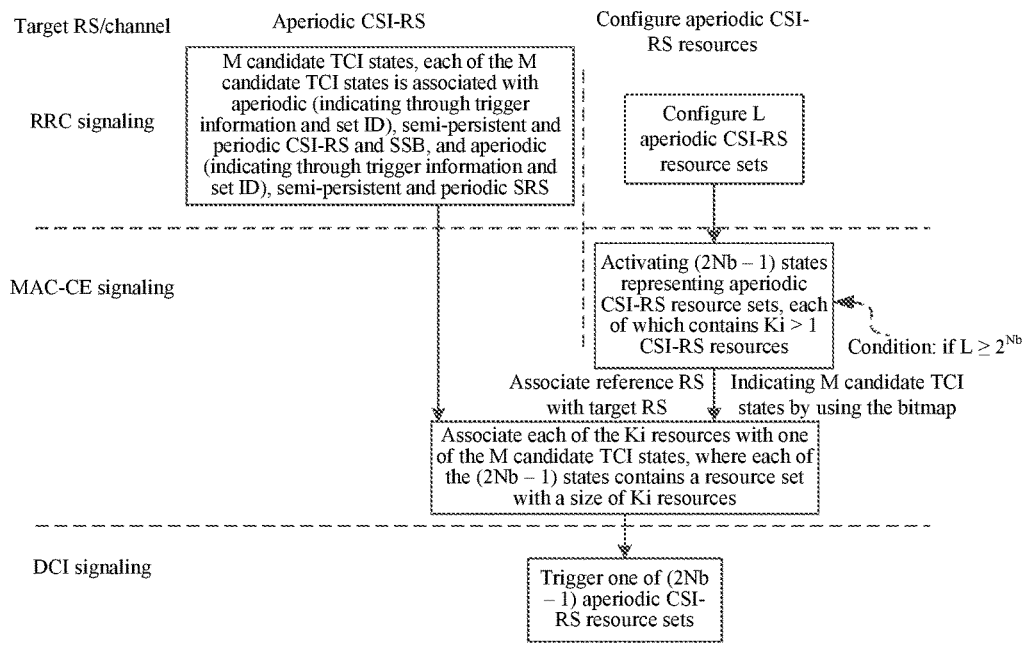
FIG. 2 is a schematic diagram of a beam indication for aperiodic CSI-RS according to an embodiment of the present application.

FIG. 2 is a schematic diagram of beam indication for aperiodic CSI-RS according to an embodiment of the present application. The same set of candidate TCI states as PDCCH and PDSCH is shared. FIG. 2 involves the following items:

Target RS/channel;
RRC signaling;
MAC-CE signaling;
DCI signaling;
Aperiodic CSI-RS;
Configuring aperiodic CSI-RS resources;
Configuring L aperiodic CSI-RS resource sets;
M candidate TCI states, each of which is associated with aperiodic (identified by triggered info or set ID), semi-persistent and periodic CSI-RS and SSB, and aperiodic (identified by triggered info or set ID), semi-persistent and periodic SRS;
Activating $(2^{Nb}-1)$ states representing aperiodic CSI-RS resource sets, each of which contains Ki>1 CSI-RS resources;
Associating each of the Ki resources with one of the M candidate TCI states, where each of the $(2^{Nb}-1)$ states contains a resource set with a size of $K_i$ resources;
Triggering one of $(2^{Nb}-1)$ aperiodic CSI-RS resource sets.

In addition to the candidate TCI states configured through RRC signaling, L aperiodic CSI-RS resource sets are configured through RRC signaling. If L is greater than or equal to $2^{Nb}$, $(2^{Nb}-1)$ states are activated. Each state is associated with a corresponding CSI-RS resource set. Each resource set includes Ki CSI-RS resources. In an embodiment, a bitmap method may be used to activate $(2^{Nb}-1)$ aperiodic CSI-RS resource sets from the L aperiodic CSI-RS resource sets. In an embodiment, the number of non-zero elements in the bitmap may implicitly indicate the size of Nb. Then, the MAC-CE signaling is used to associate the candidate TCI states with the aperiodic CSI-RS resources to allow the DCI triggering of the last $(2^{Nb}-1)$ aperiodic CSI-RS resource sets.

In addition, if at least one set of a set in a first type set or a set in a second type set and an uplink reference signal index are jointly encoded to indicate one element in the joint coding or indicate the uplink reference signal index, this is applied to indication of at least one of (a) an associated uplink demodulation reference signal or a channel characteristic assumption of the associated uplink demodulation reference signal or (b) a channel characteristic assumption of an associated sounding reference signal (SRS).

Then, a fourth type signaling carrying the preceding information is sent to a second communication node.

In an embodiment, a constraint condition of a channel characteristic assumption of the fourth type signaling is stronger than a constraint condition of a channel characteristic assumption of a third type signaling. A channel characteristic assumption of the fourth type signaling is based on the same spatial filter or based on one of parameter set Doppler spread, Doppler shift, delay spread, average delay, average gain, and spatial parameters, or parameter set Doppler spread, Doppler shift, delay spread, average delay, and spatial parameters. The third type signaling is based on only spatial parameters or spatial relationships.

In an embodiment, an uplink reference signal includes one of a sounding reference signal (SRS), a physical random access channel (PRACH) signal or an uplink demodulation reference signal (UL DMRS).

In an embodiment, the third type signaling specifies only basic spatial characteristics, for example, a sufficient correlation between an uplink reference signal beam and a downlink reference signal beam; the fourth type signaling specifies that a target uplink reference signal has to be consistent with the transmission mode of the original uplink reference signal, including a consistent spatial filter.

Compared with the related art, this application provides a method for configuring channel characteristics of a reference signal. The method includes determining a first type signaling, where the first type signaling carries a first type set and the first type set includes a plurality of index elements; and sending the first type signaling to a second communication node. Through this solution of the present application, QCL assumption or strong constraint indication method is used to differentially instruct that the uplink reference signal be used for beam training or channel state information acquisition, so as to achieve the effects of adapting to user movement and channel change scenarios, reducing beam indication overheads and increasing system flexibility.

The embodiment below is described in conjunction with the scenario of aperiodic SRS.

If the associated SRS (that is, the target reference signal) is an aperiodic SRS, when $E \geq 2^{Nd}$, $(2^{Nd}-1)$ SRS resource sets are selected from E SRS resource sets and then associated with a downlink control information (DCI) indication field so as to be used for aperiodic SRS resource triggering; when $E < 2^{Nd}$, the E SRS resource sets are associated with the DCI indication field so as to be used for the aperiodic SRS resource triggering. The aperiodic SRS is composed of E SRS resource sets, where the ith SRS resource set includes Wi SRS resources. E, Nd and Wi are positive integers greater than or equal to 1.

In an embodiment, the $(2^{Nd}-1)$ SRS resource sets are selected from the E SRS resource sets by using the bitmap.

Compared with the related art, this application provides a method for configuring channel characteristics of a reference signal. The method includes determining a first type signaling, where the first type signaling carries a first type set and the first type set includes a plurality of index elements; and sending the first type signaling to a second communication node. Through this solution of the present application, QCL assumption or strong constraint indication method is used to differentially instruct that the uplink reference signal be used for beam training or channel state information acquisition, so as to achieve the effects of adapting to user movement and channel change scenarios, reducing beam indication overheads and increasing system flexibility.

Figure 3:
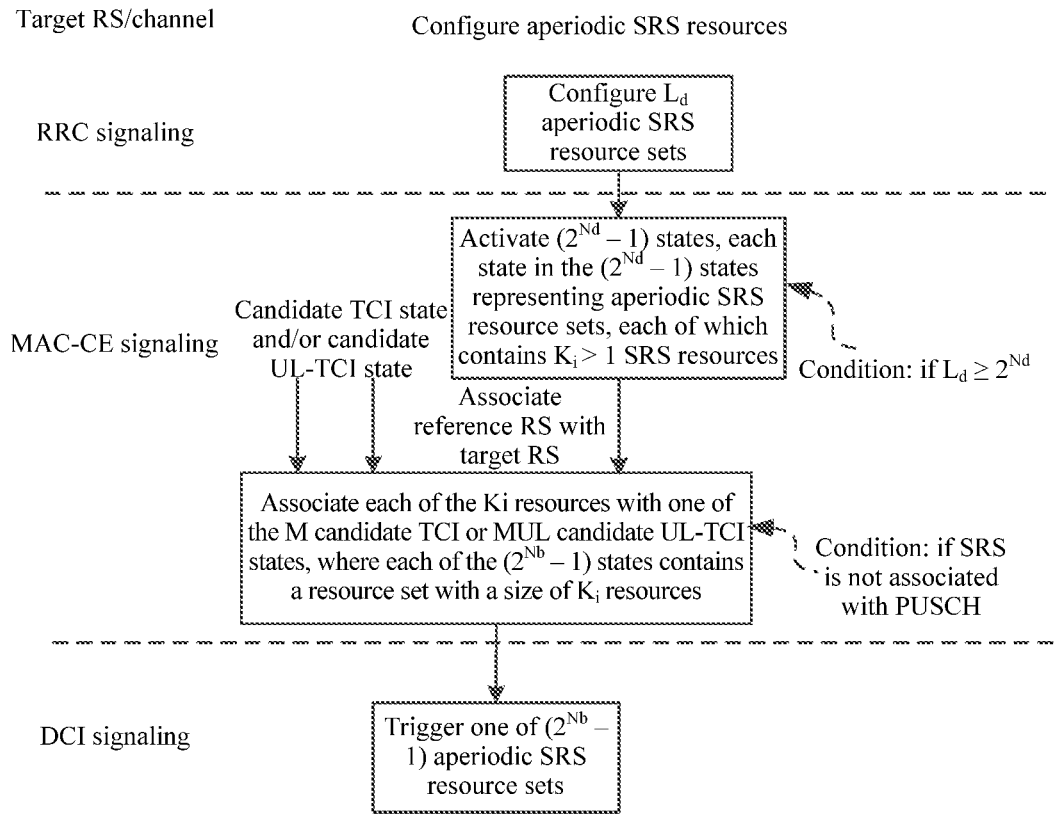
FIG. 3 is a schematic diagram of configuration of channel state information for aperiodic SRS according to an embodiment of the present application.

FIG. 3 is a schematic diagram of configuration of channel state information for aperiodic SRS according to an embodiment of the present application. FIG. 3 involves the following items:

Target RS/channel;
RRC signaling;
MAC-CE signaling;
DCI signaling;
Configuring aperiodic SRS resources;
Configuring $L_d$ aperiodic SRS resource sets;
Activating $(2^{Nd}-1)$ states representing aperiodic SRS resource sets, each of which contains $K_i > 1$ SRS resources;
Associate reference RS with target RS;
Associating each of the Ki resources with one of the M candidate TCI or MUL candidate UL-TCI states, where each of the $(2^{Nb}-1)$ states contains a resource set with a size of $K_i$ resources; and
Triggering one of $(2^{Nb}-1)$ aperiodic SRS resource sets.

First, $L_d$ aperiodic SRS resource sets are configured through RRC signaling. Then, $(2^{Nb}-1)$ states are activated through MAC-CE signaling. Each SRS resource set includes $K_1$ SRS resources. Then, association with SRS is performed through candidate TCI states or UL-TCI states. Here two association methods can be performed. In the first association method, regulation is performed through a QCL or spatial association method and only an uplink transmission beam is constrained roughly. In the second association method, constraint is performed through SRI or CRI, and a target reference signal is required to fully obey the filter indicating the reference signal or complete channel characteristic requirements. Finally, aperiodic SRS resources are triggered and indicated through DCI signaling.

In an embodiment, only when $L_d$ is greater than or equal to Nd, is MAC-CE signaling required for selection; when $L_d$ is less than Nd, the signaling may be omitted. However, the target reference signal may be associated with the source reference signal (that is, candidate TCI) through MAC-CE signaling.

The candidate UL-TCI states may be referred to as a third type set. The third type set includes T sets. The ith set of the T sets includes Ri uplink reference signal index elements. T and Ri are integers greater than or equal to 1. In view of a single beam, each set in the third type set may include one index element.

In summary, the CSI-RS, the SRS or the IMR reference signal is an aperiodic reference signal, and when the number of reference signal resources or reference signal resource sets is greater than or equal to $2^G$, $(2^G-1)$ resources or resource sets are selected from Y reference signal resources or reference signal resource pools; and then each set in the selected $(2^G-1)$ resources or resource sets is associated with the set in the second type set indicated by the third type signaling or with the set in the first type set indicated by the third type signaling.

The embodiment below is described in conjunction with the scenario of how to solve the bounding relationship between one part and beam reporting.

Sets in the first type set and the second type set or elements in the sets are allowed to be associated with a beam report. The indicated sets or elements in the sets are updated according to a beam report result. After receiving the beam report, a first communication node sends acknowledgement signaling to a second communication node. The acknowledgement signaling is used for indicating an update effective time. The update effective time is X slots after the acknowledgement signaling is sent. X is an integer greater than or equal to 1.

A channel characteristic assumption of a downlink reference signal associated with one set in the first type set or an index element in the one set in the first type set or one set in the second type set or an index element in the one set in the second type set is updated; or the downlink reference signal associated with the one set in the first type set or the index element in the one set in the first type set or the one set in the second type set or the index element in the one set in the second type set is activated. Here, the downlink reference signal includes at least one of a CSI-RS, a CSI-RS for time-frequency tracking, or a TRS.

Figure 4:
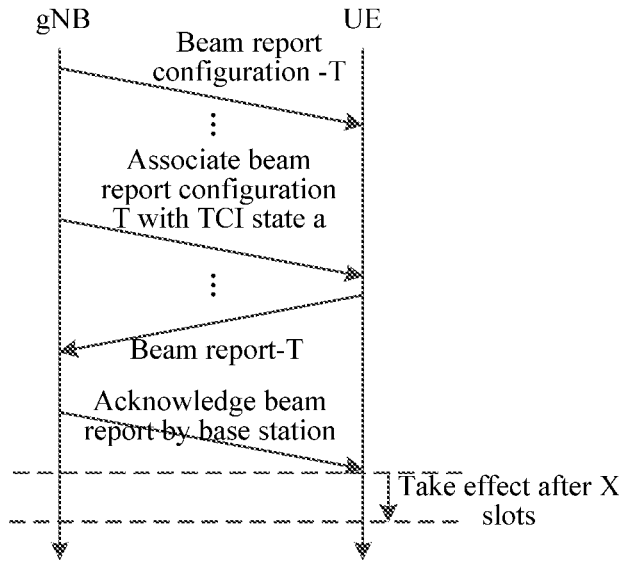
FIG. 4 is a schematic diagram of beam indication associated with a beam report according to an embodiment of the present application.

FIG. 4 is a schematic diagram of beam indication associated with a beam report according to an embodiment of the present application. First, a base station configures beam report configuration T to a UE and associates the beam report configuration T with TCI state a. In an embodiment, configuration of the beam report may be implemented through measurement configuration. After the UE performs beam reporting, the base station needs to send acknowledgement signaling to the UE. Only after the acknowledgement signaling takes effect, can TCI state a be associated with the result in the beam report, such as the beam of the best RSRP. In view of the costs of the UE response, the association takes effect only after X slots, for example, four slots. The value of X may be determined according to the capability of the UE. After X slots, if the base station further indicates TCI-a, the reference signal associated with the report will become the original reference signal for beam indication.

In an embodiment, because the UE reporting may fail, misjudgments of the two sides easily occur if the base station sends no acknowledgement signaling. For example, the UE determines that the information has been notified to the base station, but the base station has not received the information. Therefore, the acknowledgement signaling, that is, the response information, of the base station significantly improves the stability and reliability of the TCI state update (that is, the associated original reference signal). In an embodiment, DCI of the acknowledgement signaling is carried, a PDSCH is scheduled, the DCI of the acknowledgement signaling is not carried as desired by a UE, or the PDSCH is not scheduled or associated.

The embodiment below is described in conjunction with the scenario of a port index indication method.

Figure 5:
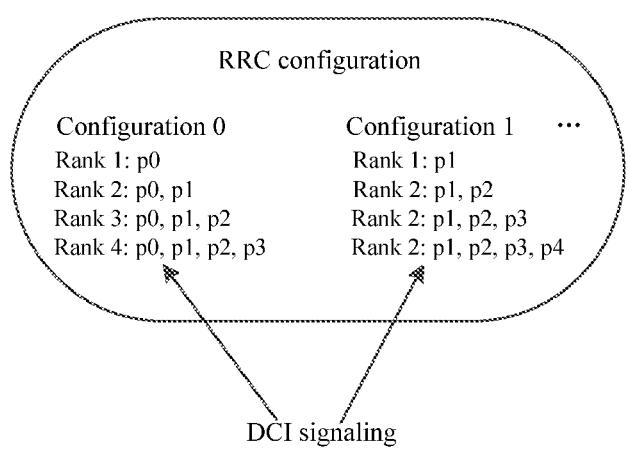
FIG. 5 is a schematic diagram of port indication for CSI reporting according to an embodiment of the present application.

FIG. 5 is a schematic diagram of port indication for CSI reporting according to an embodiment of the present application. The base station instructs the terminal to measure and report CSI according to an indication of a group of port indexes. The understanding of the indication of the group of port indexes by the UE satisfies characteristic requirements such as a characteristic of inter-layer nesting. For example, such rule is defined: a port group for measuring rank i by the UE is a subset of a port group for measuring rank j. i<j. See FIG. 5. In this manner, only the port sequence of rank 8 needs to be reported through signaling.

In an embodiment, the first communication node (base station) instructs the second communication node (UE) to report CSI according to an indication of a group of port indexes, where the understanding of the indication of the group of port indexes by the second communication node satisfies characteristic requirements. In an embodiment, the characteristic requirements include a characteristic of inter-layer nesting. In an embodiment, the characteristic of the inter-layer nesting is as follows: a port group for measuring rank i is a subset of a port group for measuring rank j. i<j. i and j are integers greater than or equal to 1.

In summary, based on the solution provided in this embodiment of the present application, a multi-layer beam indication architecture and a method of using a bitmap are established. Index sets are created and part of the index sets are activated (specific index sets are indicated) so that beam indication is implemented for a downlink data channel, a downlink control channel, a downlink reference signal, an uplink control channel, an uplink data channel and an uplink reference signal. As regards indication of the uplink reference signal, provided are two indication methods having different constraint intensities, that is, QCL assumption or strong constraint indication method, to differentially instruct that the uplink reference signal be used for beam training or channel state information acquisition.

Similar in concept to or same in concept as the preceding embodiments, this embodiment of the present application further provides a method for configuring channel characteristics of a reference signal. The method is applied to a second communication node and includes that the second communication node receives a first type signaling sent by a first communication node; and obtains a first type set carried in the first type signaling, where the first type set includes a plurality of index elements.

Each index element includes at least one of an index element number, a reference signal type index, a reference signal resource configuration index, a reference signal resource set index, a reference signal resource index, a reference signal port index, a resource block index, a resource block burst index, a resource block burst set index, a measurement limit window index, a time domain window index, a report configuration index, a beam grouping index, a measurement constraint, a configuration constraint, a time constraint, trigger information or a reference signal group index.

A reference signal includes at least one of: a synchronization signal block (SS block), a channel state indication reference signal (CSI-RS), a sounding reference signal (SRS), a physical random access channel (PRACH) signal or a demodulation reference signal (DMRS).

The first type set carried in the first type signaling includes M sets. The ith set in the first type set includes Ni index elements. M and Ni are integers greater than or equal to 1. In an embodiment, each set in the first type set includes one index element.

The first type set is a transmission configuration indication state, a candidate transmission configuration indication state or an uplink transmission configuration indication state.

The method further includes that the second communication node receives related reconfiguration information sent by the first communication node to indicate reconfiguration of the first type set; and the second communication node reconfigures the first type set according to the received related reconfiguration information indicating reconfiguration of the first type set. Reconfiguring the first type set includes at least one of the following operations: adding a new first type set to the first type set; deleting a indicated set from the first type set; updating a indicated element in the indicated set in the first type set; deleting the indicated element in the indicated set in the first type set; or adding a new index element to the indicated set in the first type set.

In this embodiment of the present application, the method further includes that the second communication node receives a second type signaling sent by the first communication node, where indication information of a second type set is carried in the second type signaling to indicate the second type set based on the first type set for the second communication node; and the second communication node obtains the second type set based on the first type set according to the indication information of the second type set carried in the received second type signaling.

The action of obtaining the second type set based on the first type set according to the indication information of the second type set carried in the received second type signaling includes at least one of the following manners: activating part of sets in the first type set and forming the second type set by the activated sets in the first type set; combining part or all of the sets in the first type set into the second type set; or combining index elements in the sets in the first type set into the second type set.

The obtained second type set includes S sets. The ith set in the second type set includes Ki index elements. S and Ki are integers greater than or equal to 1.

In this embodiment of the present application, the method further includes that the second communication node receives a bitmap sent by the first communication node; and the second communication node obtains the second type set according to indication information carried in the received bitmap. The indication information carried in the bitmap is used for instructing sets or elements in the first type set to form the second type set.

Each set in the first type set or each index element in the sets in the first type set corresponds to a respective bit in the bitmap. A specific value in a bit position represents activation, combination or selection of a set associated with the bit position or indicates activation, combination or selection of an index element in the set associated with the bit position.

Sets or elements in the sets selected through the bitmap are encoded in an order of bits in the bitmap to indicate sets in the second type set or elements in the sets in the second type set.

In the second type set, X1 sets in the second type set are indicated explicitly and L−X1 sets in the second type set are indicated by using the bitmap.

X1 and L are integers greater than or equal to 1, L denotes the number of sets in the second type set carried in the second type signaling and X1 denotes an integer less than L.

In this embodiment of the present application, the method further includes that the second communication node receives a third type signaling sent by the first communication node, where indication information of a third type set is carried in the third type signaling to instruct the second communication node to designate a set in the range of the first type set or the second type set; and the second communication node determines, according to the indication information of the third type set, that the indicated set in the range of the first type set or the second type set indicates at least one of the following items: item 1: a channel characteristic assumption of an associated downlink demodulation reference signal; item 2: an associated uplink demodulation reference signal or a channel characteristic assumption of the associated uplink demodulation reference signal; item 3: an associated physical uplink control channel (PUCCH) or an associated layer of the associated PUCCH; item 4: an associated physical uplink shared channel (PUSCH) or an associated layer of the associated PUSCH; item 5: a channel characteristic assumption of an associated channel state indication reference signal (CSI-RS); item 6: a channel characteristic assumption of an associated sounding reference signal (SRS); or item 7: a channel characteristic assumption of an associated interference measurement resource (IMR).

In this embodiment of the present application, the method further includes that the second communication node receives a third type set sent by the first communication node. The third type set includes T sets. The ith set of the T sets includes Ri uplink reference signal index elements. T and Ri are integers greater than or equal to 1.

In this embodiment of the present application, the method further includes that the second communication node receives a fourth type signaling sent by the first communication node, where indication information of a fourth type set is carried in the fourth type signaling to instruct the second communication node to designate a set in the range of the first type set, a second type set or a third type set; and the second communication node determines, according to the indication information of the fourth type set, that the indicated set in the range of the first type set, the second type set or the third type set indicates at least one of the following items: an associated uplink demodulation reference signal, a channel characteristic assumption of the associated uplink demodulation reference signal, an associated sounding reference signal (SRS) or a channel characteristic assumption of the SRS.

A channel characteristic assumption of the fourth type signaling is based on the same spatial filter, based on the same antenna port assumption or based on one of parameter set (a) Doppler spread, Doppler shift, delay spread, average delay, average gain, and spatial parameters, or parameter set (b) Doppler spread, Doppler shift, delay spread, average delay, and spatial parameters.

An uplink reference signal includes one of a sounding reference signal (SRS), a physical random access channel (PRACH) signal or an uplink demodulation reference signal (UL DMRS).

The UL DMRS is associated with a physical uplink control channel (PUCCH) or associated with a physical uplink shared channel (PUSCH).

A constraint condition of a channel characteristic assumption of the fourth type signaling is stronger than a constraint condition of a channel characteristic assumption of a third type signaling.

The method further includes that the second communication node receives a fifth type signaling sent by the first communication node, where the fifth type signaling is used for instructing at least one of (i) one set in the first type set or (ii) one set in a second type set be associated with a beam report of the second communication node; and updates an indicated set or index element in the set according to a beam report result.

The second communication node associates at least one of (i) one set in the first type set or (ii) one set in the second type set with the beam report of the second communication node according to the fifth type signaling; and updates the indicated set or index element in the set according to the beam report result.

The method further includes that the second communication node sends a beam report to the first communication node; and the second communication node receives acknowledgement signaling about the beam report. The acknowledgement signaling is sent by the first communication node to indicate update effective time.

In this embodiment of the present application, the update effective time is X slots after the acknowledgement signaling is sent. X is an integer greater than or equal to 1.

The method further includes that the second communication node sends link reconfiguration request signaling to the first communication node; the second communication node receives an acknowledgement response of the link reconfiguration request signaling sent by the first communication node; and after receiving the acknowledgement response, the second communication node performs at least one of the following operations: updating an agreed set in the first type set or an agreed set in the second type set to a reference signal index corresponding to a downlink reference signal indicated by the link reconfiguration request signaling sent by the first communication node; determining that a downlink reference signal and a demodulation reference signal (DMRS) of a received physical uplink shared channel (PDSCH) satisfy a channel characteristic assumption, where the downlink reference signal is the downlink reference signal indicated by the link reconfiguration request signaling; determining that an uplink reference signal and a physical uplink control channel (PUCCH) to be sent satisfy the channel characteristic assumption, where the uplink reference signal is associated with the link reconfiguration request signaling sent by the first communication node; or determining that the PUCCH to be sent and a PUCCH used by a request signaling have a same channel characteristic assumption, where the PUCCH used by the request signaling is a PUCCH used by the link reconfiguration request signaling sent by the first communication node.

The link reconfiguration request signaling is also called beam recovery request signaling.

In this embodiment of the present application, the first communication node is a base station and the second communication node is a UE.

Compared with the related art, this application provides a method for configuring channel characteristics of a reference signal. The method includes determining a first type signaling, where the first type signaling carries a first type set and the first type set includes a plurality of index elements; and sending the first type signaling to a second communication node. Through this solution of the present application, QCL assumption or strong constraint indication method is used to differentially instruct that the uplink reference signal be used for beam training or channel state information acquisition, so as to achieve the effects of adapting to user movement and channel change scenarios, reducing beam indication overheads and increasing system flexibility.

Similar in concept to or same in concept as the preceding embodiments, this embodiment of the present application further provides an apparatus for configuring reference signal channel characteristics. The apparatus is configured in a communication device, for example, a base station, and includes a signaling determination unit and a signaling sending unit.

The signaling determination unit is configured to determine a first type signaling, where the first type signaling carries a first type set and the first type set includes a plurality of index elements.

The signaling sending unit is configured to send the first type signaling to a second communication node.

In this embodiment of the present application, each index element includes at least one of an index element number, a reference signal type index, a reference signal resource configuration index, a reference signal resource set index, a reference signal resource index, a reference signal port index, a resource block index, a resource block burst index, a resource block burst set index, a measurement limit window index, a time domain window index, a report configuration index, a beam grouping index, a measurement constraint, a configuration constraint, a time constraint, trigger information or a reference signal group index.

In this embodiment of the present application, a reference signal includes at least one of a synchronization signal block (SS block), a channel state indication reference signal (CSI-RS), a sounding reference signal (SRS), a physical random access channel (PRACH) signal or a demodulation reference signal (DMRS).

In this embodiment of the present application, the first type set carried in the first type signaling includes M sets. The ith set in the first type set includes Ni index elements. M and Ni are integers greater than or equal to 1.

In this embodiment of the present application, each set in the first type set includes one index element.

In this embodiment of the present application, the first type set is a transmission configuration indication state, a candidate transmission configuration indication state or an uplink transmission configuration indication state.

In this embodiment of the present application, the signaling determination unit is further configured to, after the first type signaling is sent to the second communication node, reconfigure the first type set; and send the reconfigured first type set carried in the first type signaling to the second communication node; or send reconfiguration information related to the reconfigured first type set to the second communication node. Reconfiguring the first type set includes at least one of the following operations: adding a new first type set to the first type set; deleting a indicated set from the first type set; updating a indicated element in the indicated set in the first type set; deleting the indicated element in the indicated set in the first type set; or adding a new index element to the indicated set in the first type set.

In this embodiment of the present application, the signaling determination unit is further configured to, after the first type signaling is sent to the second communication node, determine a second type signaling, where indication information of a second type set is carried in the second type signaling to indicate the second type set based on the first type set for the second communication node; and the signaling sending unit is further configured to send the second type signaling to the second communication node. The indication information of the second type set is used for instruction about at least one of the following items: activating part of sets in the first type set and forming the second type set by the activated sets in the first type set; combining part or all of the sets in the first type set into the second type set; or combining index elements in the sets in the first type set into the second type set.

In this embodiment of the present application, the obtained second type set includes S sets. The ith set in the second type set includes Ki index elements. S and Ki are integers greater than or equal to 1.

In this embodiment of the present application, the signaling determination unit is further configured to use a bitmap to instruct the sets in the first type set or index elements in the sets in the first type set to form the second type set.

In this embodiment of the present application, each set in the first type set or each index element in the sets in the first type set corresponds to a respective bit in the bitmap. A specific value in a bit position indicates activation, combination or selection of a set associated with the bit position or indicates activation, combination or selection of an index element in the set associated with the bit position.

In this embodiment of the present application, sets or index elements in the sets selected through the bitmap are encoded in an order of bits in the bitmap to indicate sets in the second type set or index elements in the sets in the second type set.

In this embodiment of the present application, in the second type set, X1 sets in the second type set are indicated explicitly and L-X1 sets in the second type set are indicated by using the bitmap.

X1 and L are integers greater than or equal to 1, L denotes the number of sets in the second type set carried in the second type signaling and X1 denotes an integer less than L.

In this embodiment of the present application, the signaling determination unit is further configured to determine a third type signaling, where indication information of a third type set is carried in the third type signaling to instruct the second communication node to designate a set in a range of the first type set or the second type set; and the signaling sending unit is further configured to send the third type signaling to the second communication node. The indication information of the third type set is used for instruction about at least one of the following items: item 1: a channel characteristic assumption of an associated downlink demodulation reference signal; item 2: an associated uplink demodulation reference signal or a channel characteristic assumption of the associated uplink demodulation reference signal; item 3: an associated physical uplink control channel (PUCCH) or an associated layer of the associated PUCCH; item 4: an associated physical uplink shared channel (PUSCH) or an associated layer of the associated PUSCH; item 5: a channel characteristic assumption of an associated channel state indication reference signal (CSI-RS); item 6: a channel characteristic assumption of an associated sounding reference signal (SRS); or item 7: a channel characteristic assumption of an associated interference measurement resource (IMR) reference signal.

In this embodiment of the present application, the signaling determination unit is further configured to determine a third type set; and the signaling sending unit is further configured to send the third type set to the second communication node. The third type set includes T sets. The ith set of the T sets includes Ri uplink reference signal index elements. T and Ri are integers greater than or equal to 1.

In this embodiment of the present application, the signaling determination unit is further configured to determine a fourth type signaling, where indication information of a fourth type set is carried in the fourth type signaling to instruct the second communication node to designate a set in a range of the first type set, a second type set or a third type set; and the signaling sending unit is further configured to send the fourth type signaling to the second communication node. The indication information of the fourth type set is used for instruction about at least one of (i) or (ii): (i) an associated uplink demodulation reference signal or a channel characteristic assumption of the associated uplink demodulation reference signal; or (ii) an associated sounding reference signal (SRS) or a channel characteristic assumption of the SRS.

In this embodiment of the present application, a channel characteristic assumption of the fourth type signaling is based on the same spatial filter, based on the same antenna port assumption or based on one of parameter set (a) Doppler spread, Doppler shift, delay spread, average delay, average gain, and spatial parameters, or parameter set (b) Doppler spread, Doppler shift, delay spread, average delay, and spatial parameters.

In this embodiment of the present application, an uplink reference signal includes one of a sounding reference signal (SRS), a physical random access channel (PRACH) signal or an uplink demodulation reference signal (UL DMRS).

In this embodiment of the present application, the UL DMRS is associated with a physical uplink control channel (PUCCH) or associated with a physical uplink shared channel (PUSCH).

In this embodiment of the present application, a constraint condition of a channel characteristic assumption of the fourth type signaling is stronger than a constraint condition of a channel characteristic assumption of a third type signaling.

In this embodiment of the present application, the signaling determination unit is further configured to, when $E \geq 2^{Nd}$, select $(2^{Nd}-1)$ SRS resource sets from E SRS resource sets and then associate the $(2^{Nd}-1)$ SRS resource sets with a downlink control information (DCI) indication field for the purpose of aperiodic SRS resource triggering; when $E < 2^{Nd}$, associate the E SRS resource sets with the DCI indication field for the purpose of the aperiodic SRS resource triggering. E, Nd and Wi are positive integers greater than or equal to 1.

In this embodiment of the present application, the $(2^{Nd}-1)$ SRS resource sets are selected from the E SRS resource sets by using a bitmap.

In this embodiment of the present application, each set in the third type set includes one index element.

In this embodiment of the present application, the CSI-RS, the SRS or the IMR reference signal is an aperiodic reference signal, and the signaling determination unit is further configured to, when the number of reference signal resources or reference signal resource sets is greater than or equal to $2^G$, select $(2^G-1)$ resources or resource sets from Y reference signal resources or reference signal resource pools; and associate each set in the selected $(2^G-1)$ resources or resource sets with the set in the second type set indicated by the third type signaling or with the set in the first type set indicated by the third type signaling for the purpose of indicating a channel characteristic assumption of the selected resources or resource sets.

In this embodiment of the present application, a channel characteristic assumption includes at least one of quasi-co-location, Doppler spread, Doppler shift, delay spread, average delay, average gain, spatial receiving parameters, spatial relationships or spatial parameters.

In this embodiment of the present application, according to a rule, an agreed set in the second type set is used for indicating an associated physical uplink control channel (PUCCH) or indicating a channel characteristic assumption of a demodulation reference signal of the associated PUCCH.

In this embodiment of the present application, the rule refers to at least one of rule 1: a set of lowest serial numbers; rule 2: a set of highest serial numbers; or rule 3: a set in serial numbers configured by the first communication node.

In this embodiment of the present application, the signaling determination unit is further configured to generate a fifth type signaling, to associate at least one of one set in the first type set or one set in a second type set with a beam report of the second communication node, and to update an indicated set or index element in the set according to a beam report result.

In this embodiment of the present application, the signaling determination unit is further configured such that, after a user receives acknowledgement signaling, the update effective time is X slots after the acknowledgement signaling is sent. X is an integer greater than or equal to 1.

In this embodiment of the present application, the signaling determination unit is further configured to update a channel characteristic assumption of a downlink reference signal associated with (i) the one set in the first type set or an index element in the one set in the first type set or (ii) the one set in the second type set or an index element in the one set in the second type set; or activate the downlink reference signal associated with (i) the one set in the first type set or the index element in the one set in the first type set or (ii) the one set in the second type set or the index element in the one set in the second type set.

In this embodiment of the present application, the downlink reference signal includes at least one of a CSI-RS, a CSI-RS for time-frequency tracking, or a TRS.

In this embodiment of the present application, characteristics required for the acknowledgement signaling sent to the second communication node include at least one of DCI carrying DCI of the acknowledgement signaling, scheduling a PDSCH, not carrying the DCI of the acknowledgement signaling as desired by a UE, or not scheduling or not associating the PDSCH.

In this embodiment of the present application, the first communication node instructs the second communication node to report CSI according to an indication of a group of port indexes, where the understanding of the indication of the group of port indexes by the second communication node satisfies characteristic requirements.

In this embodiment of the present application, the characteristic requirements include a characteristic of inter-layer nesting.

In this embodiment of the present application, the characteristic of the inter-layer nesting is as follows: a port group for measuring rank i is a subset of a port group for measuring rank j. i<j. i and j are integers greater than or equal to 1.

Similar in concept to or same in concept as the preceding embodiments, this embodiment of the present application further provides an apparatus for configuring reference signal channel characteristics. The apparatus is configured in a communication device, for example, a UE, and includes a signaling receiving unit and a set collection unit.

The signaling receiving unit is configured to receive a first type signaling sent by a first communication node. The first type signaling carries a first type set and the first type set includes a plurality of index elements. The set acquisition unit is configured to save the first type set.

In this embodiment of the present application, the signaling receiving unit is further configured to, receive a second type signaling sent by the first communication node, where indication information of a second type set is carried in the second type signaling to indicate the second type set based on the first type set for the second communication node; and the set collection unit is configured to obtain the second type set based on the first type set according to the indication information of the second type set carried in the received second type signaling. The action of obtaining the second type set based on the first type set according to the indication information of the second type set carried in the received second type signaling includes at least one of the following manners: activating part of sets in the first type set and forming the second type set by the activated sets in the first type set; combining part or all of the sets in the first type set into the second type set; or combining index elements in the sets in the first type set into the second type set.

In this embodiment of the present application, the UE receives an acknowledgement response of the link reconfiguration request signaling sent by the first communication node; and after receiving the acknowledgement response, the second communication node performs at least one of the following operations: updating an agreed set in the first type set or an agreed set in the second type set to a reference signal index corresponding to a downlink reference signal indicated by the link reconfiguration request signaling sent by the first communication node; determining that a downlink reference signal and a demodulation reference signal (DMRS) of a received physical uplink shared channel (PDSCH) satisfy a channel characteristic assumption, where the downlink reference signal is the downlink reference signal indicated by the link reconfiguration request signaling sent by the first communication node; determining that an uplink reference signal and a physical uplink control channel (PUCCH) to be sent satisfy the channel characteristic assumption, where the uplink reference signal is associated with the link reconfiguration request signaling; or determining that the PUCCH to be sent and a PUCCH used by a request signaling have a same channel characteristic assumption, where the PUCCH used by the request signaling is a PUCCH used by the link reconfiguration request signaling sent by the first communication node.

Similar in concept to or same in concept as the preceding embodiments, this embodiment of the present application further provides a terminal. The terminal includes a memory, a processor, and a computer program stored in the memory and executable on the processor. The processor executes the computer program to perform the method for configuring channel characteristics of a reference signal provided in any embodiment of the present application.

Similar in concept to or same in concept as the preceding embodiments, this embodiment of the present application further provides a communication device. The communication device includes the apparatus for configuring reference signal channel characteristics provided in any embodiment of the present application.

Compared with the related art, this application provides a method for configuring channel characteristics of a reference signal. The method includes determining a first type signaling, where the first type signaling carries a first type set and the first type set includes a plurality of index elements; and sending the first type signaling to a second communication node. Through this solution of the present application, QCL assumption or strong constraint indication method is used to differentially instruct that the uplink reference signal be used for beam training or channel state information acquisition, so as to achieve the effects of adapting to user movement and channel change scenarios, reducing beam indication overheads and increasing system flexibility.

What is claimed is:

1. A method of configuring reference signal channel characteristics, comprising:
receiving, by a second communication node from a first communication node, a radio resource control (RRC) signaling that carries information that describes a first set of transmission configuration indication (TCI) states,
wherein each TCI state in the first set of TCI states comprises one or more index elements that identify one or more reference signals; and
receiving, by the second communication node from the first communication node, a medium access control-control element (MAC-CE) signaling that carries information that indicates that a second set of TCI states are activated,
wherein the second set of TCI states include at least one TCI state that is activated from the first set of TCI states; and
receiving a downlink control information (DCI) signaling sent by the first communication node,
wherein the DCI signaling comprises indication information related to a TCI state from the second set of TCI states, and
wherein the indication information indicates a channel characteristic of a downlink demodulation reference signal (DMRS) and of a channel state information reference signal (CSI-RS), and a channel characteristic assumption of a sounding reference signal (SRS).

2. The method of claim 1, wherein after the receiving the RRC signaling, the method further comprises:
receiving, by the second communication node from the first communication node, a reconfigured RRC signaling that carries at least one TCI state from the first set of TCI states; and
deleting the at least one TCI state indicated by the reconfigured RRC signaling.

3. The method of claim 1,
wherein the first set of TCI states comprises M sets,
wherein the second set of TCI states comprises S sets, and
wherein S and M are integers greater than or equal to 1.

4. The method of claim 1, wherein the indication information related to the TCI state further indicates a physical uplink control channel (PUCCH).

5. The method of claim 1, wherein the indication information related to the TCI state further indicates a physical uplink shared channel (PUSCH).

6. The method of claim 1, wherein a reference signal from the one or more reference signals comprises a synchronization signal block (SS block), a channel state information reference signal (CSI-RS), or a sounding reference signal (SRS).

7. A method of configuring reference signal channel characteristics, comprising:
transmitting, by a first communication node to a second communication node, a radio resource control (RRC) signaling that carries information that describes a first set of transmission configuration indication (TCI) states,
wherein each TCI state in the first set of TCI states comprises one or more index elements that identify one or more reference signals;
transmitting, by the first communication node to the second communication node, a medium access control-control element (MAC-CE) signaling that carries information that indicates that a second set of TCI states are activated, wherein the second set of TCI states include at least one TCI state that is activated from the first set of TCI states; and transmitting a downlink control information (DCI) signaling by the first communication node,
wherein the DCI signaling comprises indication information related to a TCI state from the second set of TCI states, and
wherein the indication information indicates a channel characteristic of a downlink demodulation reference signal (DMRS) and of a channel state information reference signal (CSI-RS), and a channel characteristic assumption of a sounding reference signal (SRS).

8. The method of claim 7, wherein after the transmitting the RRC signaling, the method further comprises:
transmitting, by the first communication node to the second communication node, a reconfigured RRC signaling that carries at least one TCI state from the first set of TCI states to be deleted.

9. The method of claim 7,
wherein the first set of TCI states comprises M sets,
wherein the second set of TCI states comprises S sets, and
wherein S and M are integers greater than or equal to 1.

10. The method of claim 7, wherein the indication information related to the TCI state further indicates a physical uplink control channel (PUCCH).

11. The method of claim 7, wherein the indication information related to the TCI state further indicates a physical uplink shared channel (PUSCH).

12. The method of claim 7, wherein a reference signal from the one or more reference signals comprises a synchronization signal block (SS block), a channel state information reference signal (CSI-RS), or a sounding reference signal (SRS).

13. A second communication node, comprising:
a processor configured to execute a method, the processor configured to:
receive, by a second communication node from a first communication node, a radio resource control (RRC) signaling that carries information that describes a first set of transmission configuration indication (TCI) states,
wherein each TCI state in the first set of TCI states comprises one or more index elements that identify one or more reference signals; and
receive, by the second communication node from the first communication node, a medium access control-control element (MAC-CE) signaling that carries information that indicates that a second set of TCI states are activated,
wherein the second set of TCI states include at least one TCI state that is activated from the first set of TCI states; and
receive a downlink control information (DCI) signaling sent by the first communication node,
wherein the DCI signaling comprises indication information related to a TCI state from the second set of TCI states, and
wherein the indication information indicates a channel characteristic of a downlink demodulation reference signal (DMRS) and of a channel state information reference signal (CSI-RS), and a channel characteristic assumption of a sounding reference signal (SRS).

14. A second communication node, comprising:
a processor configured to execute a method, the processor configured to:
receive, by a second communication node from a first communication node, a radio resource control (RRC) signaling that carries information that describes a first set of transmission configuration indication (TCI) states,
wherein each TCI state in the first set of TCI states comprises one or more index elements that identify one or more reference signals; and
receive, by the second communication node from the first communication node, a medium access control-control element (MAC-CE) signaling that carries information that indicates that a second set of TCI states are activated,
wherein the second set of TCI states include at least one TCI state that is activated from the first set of TCI states; and
receive a downlink control information (DCI) signaling sent by the first communication node,
wherein the DCI signaling comprises indication information related to a TCI state from a range of the second set of TCI states, and
wherein the indication information indicates a physical uplink control channel (PUCCH), a channel characteristic of a downlink demodulation reference signal (DMRS) and of a channel state information reference signal (CSI-RS), and a channel characteristic assumption of a sounding reference signal (SRS).

15. A second communication node, comprising:
a processor configured to execute a method, the processor configured to:
receive, by a second communication node from a first communication node, a radio resource control (RRC) signaling that carries information that describes a first set of transmission configuration indication (TCI) states,
wherein each TCI state in the first set of TCI states comprises one or more index elements that identify one or more reference signals; and
receive, by the second communication node from the first communication node, a medium access control-control element (MAC-CE) signaling that carries information that indicates that a second set of TCI states are activated,
wherein the second set of TCI states include at least one TCI state that is activated from the first set of TCI states; and
receive a downlink control information (DCI) signaling sent by the first communication node,
wherein the DCI signaling comprises indication information related to a TCI state from the second set of TCI states, and
wherein the indication information indicates a physical uplink shared channel (PUSCH), a channel characteristic of a downlink demodulation reference signal (DMRS) and of a channel state information reference signal (CSI-RS), and a channel characteristic assumption of a sounding reference signal (SRS).

16. A second communication node, comprising:
a processor configured to execute a method, the processor configured to:
receive, by a second communication node from a first communication node, a radio resource control (RRC) signaling that carries information that describes a first set of transmission configuration indication (TCI) states, wherein each TCI state in the first set of TCI states comprises one or more index elements that identify one or more reference signals; and receive, by the second communication node from the first communication node, a medium access control-control element (MAC-CE) signaling that carries information that indicates that a second set of TCI states are activated,
- wherein the second set of TCI states include at least one TCI state that is activated from the first set of TCI states; and receive a downlink control information (DCI) signaling sent by the first communication node,
- wherein the DCI signaling comprises indication information related to a TCI state from the second set of TCI states, and
- wherein the indication information indicates a channel characteristic of a downlink demodulation reference signal (DMRS) and of a channel state information reference signal (CSI-RS), and a channel characteristic assumption of a sounding reference signal (SRS).

17. A first communication node, comprising:

a processor configured to execute a method, the processor configured to:

transmit, by a first communication node to a second communication node, a radio resource control (RRC) signaling that carries information that describes a first set of transmission configuration indication (TCI) states,
- wherein each TCI state in the first set of TCI states comprises one or more index elements that identify one or more reference signals;

transmit, by the first communication node to the second communication node, a medium access control-control element (MAC-CE) signaling that carries information that indicates that a second set of TCI states are activated,
- wherein the second set of TCI states include at least one TCI state that is activated from the first set of TCI states; and transmit a downlink control information (DCI) signaling by the first communication node,
- wherein the DCI signaling comprises indication information related to a TCI state from the second set of TCI states, and
- wherein the indication information indicates a channel characteristic of a downlink demodulation reference signal (DMRS) and of a channel state information reference signal (CSI-RS), and a channel characteristic assumption of a sounding reference signal (SRS).

18. The first communication node of claim 17, wherein the indication information related to the TCI state further indicates any one or more of the following: a physical uplink control channel (PUCCH), or a physical uplink shared channel (PUSCH).

19. The apparatus of claim 17, wherein after the transmit the RRC signaling, the processor is further configured to:
transmit, by the first communication node to the second communication node, a reconfigured RRC signaling that carries at least one TCI state from the first set of TCI states to be deleted.

20. The apparatus of claim 17,
wherein the first set of TCI states comprises M sets,
wherein the second set of TCI states comprises S sets, and
wherein S and M are integers greater than or equal to 1.

* * * * *